United States Patent [19]

King

[11] 4,300,305
[45] Nov. 17, 1981

[54] ANIMAL TRAP

[76] Inventor: Lawrence King, General Delivery, Clarkleigh, Manitoba, Canada, R0C 0R0

[21] Appl. No.: 64,484

[22] Filed: Aug. 6, 1979

[51] Int. Cl.³ ............................................. A01M 23/24
[52] U.S. Cl. ............................................ 43/81; 43/85
[58] Field of Search ..................... 43/80, 81, 81.5, 82, 43/83, 83.5, 85, 86

[56] References Cited

U.S. PATENT DOCUMENTS

| | | | |
|---|---|---|---|
| 1,244,563 | 10/1917 | Uhls | 43/86 |
| 1,831,621 | 11/1931 | Cooper | 43/85 |
| 1,881,871 | 10/1932 | Nerby | 43/85 |
| 3,161,984 | 12/1964 | Martin | 43/85 |

*Primary Examiner*—Stephen G. Kunin
*Assistant Examiner*—Robert P. Olszewski
*Attorney, Agent, or Firm*—Stanley G. Ade

[57] ABSTRACT

A swingable frame or trap bar component is pivotally mounted by one end thereof to one end of a stationary frame which includes a pair of spaced and parallel side frames extending upwardly from a base. A heavy duty coil spring normally urges the trap bar component to be released or vertical position. A trigger plate pivoted to the base and is held in the set position by a trigger pivotally mounted on a cross bar between the side frames, said trigger overlying the distal end of the trap bar component when the same is placed in the set position parallel to the base and against pressure of the spring. The trigger engages under the trigger plate to hold the trap in the set position. A sloping cross piece on the trap bar component is engaged by the trigger which is slidable across the cross bar enabling a degree of sensitivity to be imported to the release of the trigger by depression of the trigger plate. When released, the trap bar component pivots around a mounting point swinging in an arc between the side frames and traps the animal between the trap bar component and a stop cross bar extending between the side frames substantially above the mounting point of the trap bar component and the spring, which urges it to the release position.

6 Claims, 13 Drawing Figures

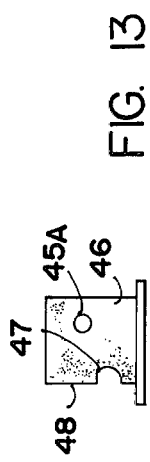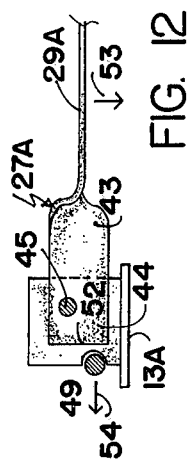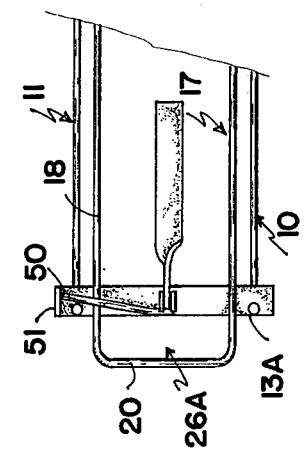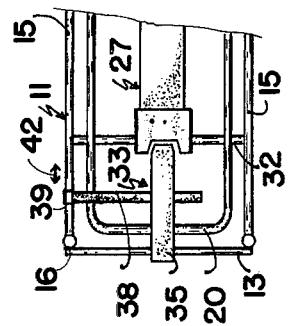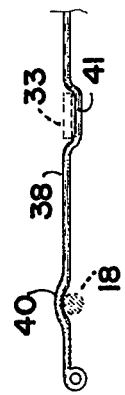
FIG. 13
FIG. 12
FIG. 11
FIG. 9
FIG. 10

ANIMAL TRAP

BACKGROUND OF THE INVENTION

This invention relates to new and useful improvements in animal traps and although this particular trap is designed specifically for use in trapping muskrats, mink and the like, nevertheless it will be appreciated that it can readily be adapted for use in the trapping of other animals.

Prior art traps suffer from several disadvantages, particularly when used with animals such as muskrats and mink, these disadvantages including difficulty in adapting same for placement across an area through which the mink or muskrat would normally swim or run, and, in certain circumstances, difficulty in adjusting the sensitivity of the release mechanism.

Another disadvantage of the prior art traps is the fact that the springs normally operating same, are at their weakest at the killing zone and sometimes do not kill efficiently. If stronger springs are used to ensure sufficient striking power at the killing zone, then the traps are often difficult to set and sometimes dangerous to set.

Prior art traps known to the applicant and which include these faults are Canadian Pat. No. 250,548 and U.S. Pat. Nos. 3,996,691; 2,068,656; 1,850,534; 370,700; 3,146,545; 2,894,353 and 1,247,171.

SUMMARY OF THE INVENTION

The present invention overcomes these disadvantages by the construction thereof and in accordance with the invention there is provided an animal trap assembly which includes a frame having a pair of substantially vertical side portions in spaced and parallel relationship, means adjacent the base of said side portions maintaining same in said spaced and parallel relationship, a movable trap bar component pivoted by one end thereof between and adjacent to the lower sides of one end of said frame and pivotable from a substantially horizontal set position to a substantially vertical release position and vice versa, spring means normally urging said trap bar component to the release position, means extending between the side portions at said one end thereof against which said trap bar component engages when in the released position and a trigger assembly in said frame towards the other end of said frame, detachably engageable with said trap bar component, for detachably holding said trap bar component in the set position.

In the preferred embodiment, means may be provided to adjust the sensitivity of the trigger mechanism so that the trapper can decide on the degree of pressure required in order to release the trap.

Another advantage of the present invention is that it is particularly suited for use in trapping animals such as mink, muskrats and the like.

A still further advantage of the invention is to provide a device of the character herewithin described which is extremely simple in construction, economical in operation, and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 9 is a fragmentary top plan view of an alternative embodiment of the trap.

FIG. 10 is a side elevation of the adjustable leverage link of FIG. 9.

FIG. 11 is a fragmentary top plan view of a yet further embodiment of the invention.

FIG. 12 is an enlarged fragmentary view of the trigger release portion thereof.

FIG. 13 is a side elevation of one of the mounting lugs for the trigger plate of FIG. 11.

In the drawings like characters of reference indicate corresponding parts in the different figures.

DETAILED DESCRIPTION

Figure 1:
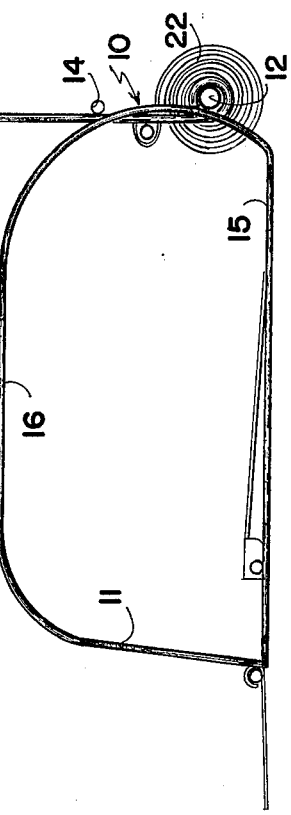
FIG. 1 is a side elevation of the trap in the released position.
Figure 7:
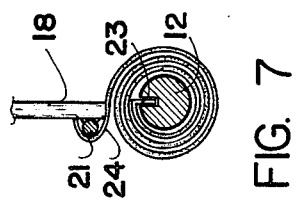
FIG. 7 is an isometric view of the trigger per se.
Figure 8:
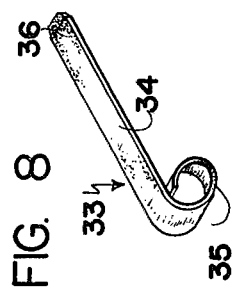
FIG. 8 is an enlarged fragmentary cross sectional view of the spring showing the engagement with the frame and with the trigger bar assembly.

Proceeding therefore to describe the invention in detail, reference should first be made to FIGS. 1 and 8 of the accompanying drawings. The trap consists of a frame collectively designated 10, said frame including a pair of spaced and parallel side frame portions collectively designated 11 maintained in the spaced apart relationship by means of a cross bar 12 spanning the side frame portions at one end thereof, a further cross bar 13 spanning the side frame portions at the other end thereof, and a further stop cross bar 14 spanning the side frame portions at said one end thereof but spaced above the first mentioned cross bar 12, which, in this embodiment, is of a larger diameter than the cross bars 13 and 14, the purpose of which will hereinafter be described.

The side frame portions include a longitudinally extending base portion 15 with an over-spanning curved portion 16 extending between the ends of the longitudinally extending portion 15. The various cross bars 12, 13 and 14 are welded to the over-spanning portions 16 and extend between thus maintaining these over-spanning portions in the desired spaced and parallel relationship, it being understood that the space between the cross bars 13 and 14 through the over-spanning portions 16, is completely clear.

The trap frame 10 is preferably made from steel rod and is of a welded construction and it has been found that ¼" steel rod is suitable. However, it is to be understood that the material and configuration of the over-spanning portions is not limited and may be varied according to design parameters.

Figure 6:
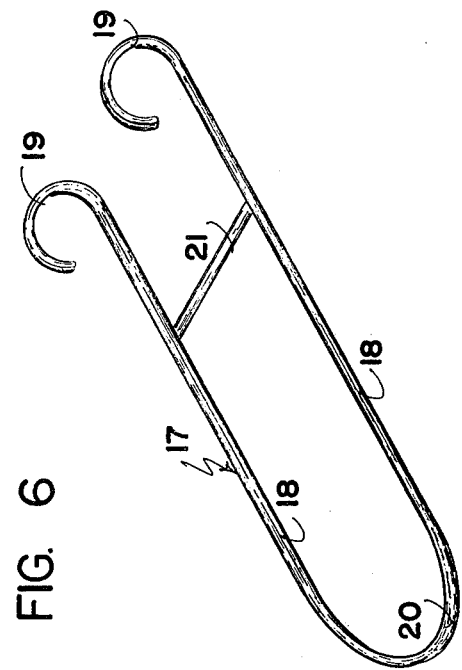
FIG. 6 is an isometric view of the trigger bar component per se.

A trap bar component is provided collectively designated 17 and in this embodiment, the trap bar component includes a pair of spaced and parallel longitudinally extending side portions 18 having loops or eyes 19 formed on the distal ends thereof as clearly shown in FIG. 6. A curved cross bar 20 extends between the other ends of the portions 18 and it will be understood that, if desired, the portions 18, 19 and 20 can be formed from one piece of material.

A further cross bar 21 is welded to the undersides of the portions 18, spaced forwardly from the eyes 19 as clearly illustrated.

Figure 2:
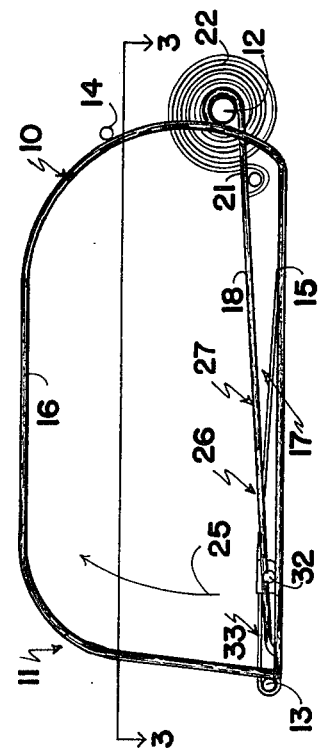
FIG. 2 is a view similar to FIG. 1 but showing the trap in the set position.

These eyes 19 freely engage around the relatively large diameter cross bar 12 so that the trap bar component can pivot from a substantially horizontal or set position shown in FIG. 2, to a vertical or released position shown in FIG. 1 and vice versa. When in the released position, it will be noted that the portions 18 of the trap bar component bear against the cross bar 14, extending between the side frame portions 11.

A heavy duty flat coil spring 22 is engaged by one end thereof within a slot 23 formed in the cross bar 12 and the looped other end 24 of the flat steel spring engages around the cross bar 21 extending between the portions 18 of the trap bar component. The spring is positioned so that when assembled, the spring urges the trap bar component to the released position against the stop cross bar 14 but when the trap bar component is moved to the set position, the spring tension is increased due to the winding action of the spring as the trap bar component moves in an arc opposite to the arc shown by arrow 25 in FIG. 2. Although the flat coil spring 22 is the preferred type of spring, nevertheless it will of course be appreciated that other types of spring may be utilized cooperating between the frame and the trap bar component to provide a similar action as hereinbefore described.

Figure 5:
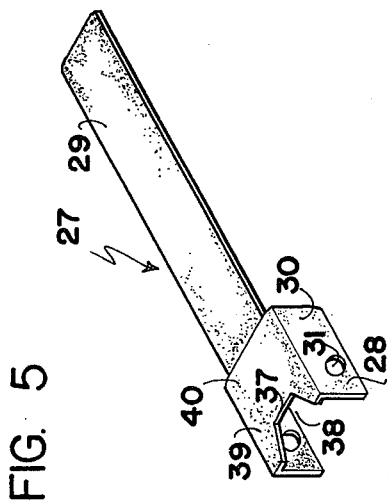
FIG. 5 is an isometric view of the trigger plate per se.

A trigger assembly collectively designated 26 is provided to detachably hold the trap bar component in the set position shown in FIG. 2. This trigger assembly includes a trigger plate collectively designated 27. This trigger plate includes a U-shaped mounting and trigger engagement portion 28 with a trigger plate member 29 extending therefrom as clearly illustrated in FIG. 5. The side flanges 30 of the U-shaped portion 28 are apertured as at 31 and are freely mounted for pivotal movement upon a further cross bar 32 secured to and spanning the base members 15 of the side frame portions adjacent but spaced from the cross bar 13. When in the set position, as will hereinafter be described, the trigger plate 29 lies between the side members 18 of the trigger bar component and in a substantially horizontal position adjacent the base members 15 of the side frame portions.

Figure 3:
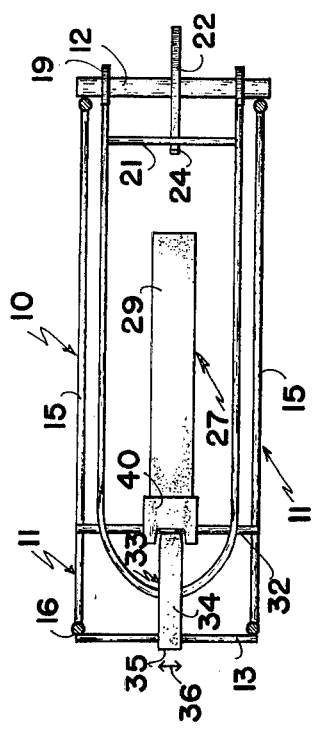
FIG. 3 is a plan view of the trap taken along the line 3—3 of FIG. 2.

A trigger collectively designated 33 comprises an elongated flat metal portion 34 having a curved end portion 35 in the form of an eye which freely engages around the cross bar 13 at the other end of the side frames and can be moved sideways thereacross as will hereinafter be described, said sideways movement being indicated by double headed arrow 36 in FIG. 3.

The distal end 36 of the trigger may engage under a transverse wall 37 of a U-shaped cut-out portion 38 formed at the rear end 39 of the top portion 40 of the U-shaped member 28 of the trigger plate assembly 27. When in the set position, with the trap bar component in the substantially horizontal position shown in FIGS. 2 and 3, the trigger 33 overlies the cross bar 20 of the trigger bar component with the distal end just engaging under the wall 37 so that the tension of spring 22 is attempting to urge the trigger 33 in the upward position thus supplying tension between the trigger and the trigger plate assembly and maintaining the trap in the set position. As soon as the trigger plate portion 29 is depressed, it pivots around the cross bar 32 thus disengaging the wall 33 from the distal end 36 of the trigger and permitting the spring 22 to move the trap bar component in the direction of arrow 25 with the full force of the spring thus trapping the animal between the trigger bar component and the over-spanning portions 16 of the side frames with the energy of the spring being maintained through the entire release movement.

Figure 4:
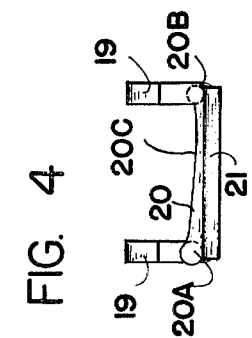
FIG. 4 is an end view of the trap bar component per se.

Reference to FIG. 4 will show that the substantially vertical thickness of the cross bar portion 20 of the trigger bar component tapers from one end 20A towards the other end 20B due to the sloping upper surface 20C. By sliding the trigger along the cross bar 13, the degree of engagement of the distal end 36 under the wall 37 may be varied within limits thus adjusting the sensitivity of the trigger mechanism so that the trapper may make this adjustment depending upon circumstances and his own personal choice of trapping practices.

FIGS. 9 and 10 show one embodiment of the trap hereinbefore described which includes an adjustable leverage link 38 which assists in the adjustment of the sensitivity of the trigger mechanism.

This adjustable leverage link is freely pivoted by one end 39 thereof to the base 15 of one of the side frame portions 10 and extends transversely across adjacent the end 20 of the trap bar component which is extended slightly in this embodiment to adjacent the cross bar 13 of the frame. The link 38 then passes under the trigger 33 as illustrated in FIG. 9. The adjustable leverage link 38 may be shaped as shown in FIG. 10 to include a raised portion 40 where it passes over the side 18 of the trap bar component and depressed as at 41 where it passes under the trigger 33.

By moving the adjustable leverage line 38 along bar 15, within limits, in the direction of double headed arrow 42, the amount of leverage and hence the sensitivity of the trigger assembly may be varied.

FIGS. 11, 12 and 13 shown an alternative embodiment of the trap which is particularly suitable for relatively light-weight traps used for small fur bearing animals. The trigger assembly collectively designated 26A in this embodiment, is mounted upon a transverse bar or plate 13A extending between the ends of the side frame members 10 and 11 in a manner similar to that hereinbefore described.

The trigger plate in this embodiment, is collectively designated 27A and is formed from a flat plate angulated through 90° as indicated by reference character 43, adjacent the inner end 44 thereof. The inner end is situated vertically and the distal end portion 29A, is planar or horizontal similar to the trigger plate hereinbefore described.

The trigger plate is pivotally mounted upon a pivot pin 45, between a pair of upstanding spaced and parallel lugs 46 secured to the cross bar or plate 13A as clearly shown in FIGS. 12 and 13 and it will be noticed that these lugs 46 are semicircularly notched as at 47, on the rear sides 48 thereof and towards the cross bar or plate 13A. It will also be noticed that these notches 47 are situated below the pivot pin and pivot pin apertures 45A in the lugs 46.

The trigger, in this embodiment, is identified by reference character 49 and is preferably of cylindrical cross section. It is provided with a loop or eye 50 at one end thereof which enables it to be pivoted to an apertured lug 51 formed on or extending up from one side or one end of the cross bar or plate 13A. Other forms of pivotal mounting may of course be provided.

When in the set position, the trigger 49 engages over one side 18 of the trap bar component adjacent the cross bar portion 20 thereof and it will be noted that the trap bar component in this embodiment, extends beyond the cross bar or plate 13A.

The trigger 49 then engages the semicircular notches 47 formed in the two lugs 46 and although the notches are stated as being semicurcular, it will be appreciated that the degree of the arcuate penetration of these notches is chosen so that the trigger 49 will in fact engage these notches against the pressure of the spring 22 (not shown in this embodiment) which takes the form similar to that hereinbefore described.

When in the set position, the weight of the trigger plate 27A causes the lower side of the rear edge 52 to rest against the front side of the trigger 49 as clearly shown in FIG. 12. It will therefore be appreciated that depression of the flat portion 29A in the direction of arrow 53, will cause the side 52 of the trigger plate, to move the trigger in the direction of arrow 54 thus displacing same from the notches 47 and releasing the trigger thereby allowing the trap bar component 17 to be moved to the released position by means of the spring as hereinbefore described.

The sensitivity of the trap is controlled by the depth of the notches 47 and by the vertical distance between the pivot pin 45 and the notches 47.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An animal trap which includes a frame having a pair of substantially vertical side portions in spaced and parallel relationship, means adjacent the base of said side portions maintaining same in said spaced and parallel relationship, a movable trap bar component pivoted by one end thereof between and adjacent to the lower sides of one end of said frame and pivotable from a substantially horizontal set position to a substantially vertical release position and vice versa, spring means normally urging said trap bar component to the release position, means extending between the side portions at said one end thereof against which said trap bar component engages when in the released position, a trigger assembly in said frame towards the other end of said frame, detachably engageable with said trap bar component, for detachably holding said trap bar component in the set position, and means to vary the sensitivity of the engagement of the trigger assembly with said trap bar component within limits, said trap bar including a pair of spaced apart substantially parallel side members, a cross bar extending between the ends of said members at the other end of said trap bar component, said trigger assembly including a trigger plate pivoted by one end thereof between said side frame portions and lying between said side members of said trap bar component when in the set position, a trigger pivoted by one end thereof to said frame and between said side frame portions thereof, at the other end of said side portions and overlying said cross bar of said trap bar component when said trap is in the set position, the distal end of said trigger detachably engaging under said one end of said trigger plate when in the set position, the tension of said spring means detachably maintaining said distal end of said trigger in engagement with said trigger plate, whereby depression of said trigger plate disengages same from said trigger and thereby releases said trap bar component from the set position to the released position, said means to vary the sensitivity of the engagement of the trigger assembly with said trap bar component within limits including an adjustable leverage link pivoted by one end thereof to the base of one of said side portions and engaging over one side of said trap bar component and under said trigger and being movable lengthwise along said base, within limits, thereby varying the leverage between said trap bar component and said trigger.

2. The animal trap according to claim 1 in which said means against which said trap bar component engages when in the released position, includes a cross bar secured to and spanning the side portions of said frame at said one end thereof, a further cross bar spanning said side portions at said one end thereof, but spaced below said first mentioned cross bar, said trap bar component being pivotally connected to said further cross bar by one end thereof, said spring means reacting between said frame and said trap bar component.

3. An animal trap which includes a frame having a pair of substantially vertical side portions in spaced and parallel relationship, means adjacent the base of said side portions maintaining same in said spaced and parallel relationship, a movable trap bar component pivoted by one end thereof between and adjacent to the lower sides of one end of said frame and pivotable from a substantially horizontal set position to a substantially vertical release position and vice versa, spring means normally urging said trap bar component to the release position, means extending between the side portions at said one end thereof against which said trap bar component engages when in the released position, a trigger assembly in said frame towards the other end of said frame, detachably engageable with said trap bar component, for detachably holding said trap bar component in the set position, said trap bar component including a pair of spaced apart substantially parallel side members, a cross bar extending between the ends of said members at the other end of said trap bar component, said trigger assembly including a trigger plate pivoted by one end thereof between said frame portions and lying between said side members of said trap bar component, when in the set position, a trigger pivoted by one end thereof to one of said side frame members and overlying one side of said trap bar component and detachably engaging one end of said trigger plate when in the set position, and means to pivotally mount said trigger plate between said side frame portions, said last mentioned means including a cross bar extending between said side frame portions, a pair of lugs extending upwardly therefrom in spaced and parallel relationship, notches formed in said lugs on the rear sides thereof, said trigger plate being pivotally mounted by one end thereof between said notched lugs with the point of pivotal connection being above said notches, said trigger engaging the notches of said lugs and being engaged by the rear side of said one end of said trigger plate below the point of pivotal connection of said trigger plate to said lugs, when in the set position, downward movement of the distal end of said trigger plate displacing said trigger from said notches and thereby releasing said trigger bar component to the released position.

4. The animal trap according to claim 3 in which said means against which said trap bar component engages when in the released position, includes a cross bar secured to and spanning the side portions of said frame at said one end thereof, a further cross bar spanning said side portions at said one end thereof, but spaced below said first mentioned cross bar, said trap bar component being pivotally connected to said further cross bar by one end thereof, said spring means reacting between said frame and said trap bar component.

5. The animal trap according to claim 4 which includes means to vary the sensitivity of the engagement of the trigger assembly with said trap bar component within limits.

6. The animal trap according to claim 5 in which said trigger is movable sideways between said side frame portions, said means to vary the sensitivity of the engagement of said trigger assembly with said trap bar component including said cross bar of said trap bar component tapering in thickness from one end towards the other and, where said trigger engages same, the position of said trigger relative to said cross bar of said trap bar component varying the degree of engagement of the distal end of said trigger with said trigger plate.

* * * * *